Aug. 8, 1967     J. A. GILLIS     3,335,097

DIGESTION CATALYST

Original Filed May 7, 1964

INVENTOR.
JOHN A. GILLIS

BY *James V. Harroff*

ATTORNEY

United States Patent Office 3,335,097
Patented Aug. 8, 1967

3,335,097
DIGESTION CATALYST
John A. Gillis, Minneapolis, Minn., assignor to The Pillsbury Company, Minneapolis, Minn., a corporation of Delaware
Continuation of application Ser. No. 365,700, May 7, 1964. This application Dec. 21, 1966, Ser. No. 605,126
7 Claims. (Cl. 252—428)

This application is a continuation of Ser. No. 365,700, filed May 7, 1964, and now abandoned.

This invention relates to catalyst compositions and more particularly to an improved digestion catalyst. The invention is particularly useful in conducting Kjeldahl nitrogen determination tests.

There is wide recognition of the fact that the Kjeldahl nitrogen determination method is a complicated and time-consuming procedure. Briefly, the Kjeldahl nitrogen determination method refers to the decomposition of organic material containing aminoid nitrogen by digestion of the sample with sulfuric acid in the presence of suitable catalysts to yield ammonium sulfate quantitatively. Ammonia is liberated from the ammonium sulfate with a non-volatile alkali and distilled into a known volume of a standard acid, the excess of which is then determined by acidimetry. The procedure is particularly objectionable when run on a large-scale basis over an extended period of time. One of the most disagreeable operations to be performed in conducting the test is the preparation of the catalyst which in the past, involved mixing several toxic substances. Some of these substances are harmful if brought into contact with the skin and produce a toxic dust which can contaminate the air.

Some objections to the procedure have been overcome by placing the catalyst in a digestible container such as a small plastic bag or packet. In the last few years these packets have come into relatively wide-spread use by laboratories where Kjeldahl determinations are conducted on a large-scale basis.

The catalyst packets of the type described do, however, have certain shortcomings. One shortcoming is that the time required for the package to break open has been excessive thus slowing the test. Another disadvantage of the prior art is that the catalyst has been relatively slow acting even after the packet has opened. Yet another disadvantage of the prior art is the fact that there is a toxicity hazard present during the preparation of the packet, largely due to dusting of the catalyst materials. It was also found that the ratio of the various catalyst materials sometimes varied from one packet to another even though the catalyst materials were carefully mixed before packaging. This is believed to be due to uneven settling or stratification of the several catalyst materials in the various mechanical apparatuses which in practice must be employed for handling the mixture between the time the ingredients are mixed together and the packaging operation is completed. This phenomenon, referred to herein as stratification, can cause the composition to vary from one catalyst package to the next thereby reducing the reliability of an otherwise carefully controlled test.

In view of these and other deficiencies of the prior art, it is one object of this invention to provide an improved, prepackaged digestion catalyst which will effectively speed up the digestion time required in conducting Kjeldahl nitrogen determination tests.

Yet another object of the invention is the provision of an improved Kjeldahl nitrogen determination catalyst which can be prepared with a minimum toxicity hazard.

Yet another object of the invention is the provision of an improved packaged Kjeldahl nitrogen determination catalyst wherein the ratio of catalyst ingredients in each package can be reliably maintained within predetermined limits.

Still another object of the invention is the provision of an improved Kjeldahl nitrogen determination catalyst wherein the package will be digested in less time than required heretofore.

Still another object of the invention is the provision of an improved Kjeldahl nitrogen determination catalyst which will inhibit excessive foaming during the digestion operation.

Other more detailed and specific objects will be apparent from the accompanying specification and drawings wherein the same numerals refer to corresponding parts in the several views and wherein.

Briefly stated, in accordance with the preferred form of the invention, the catalyst comprises a major proportion of an alkali metal sulfate such as sodium sulfate, a relatively minor amount of copper selenite, a non-reactive particulate material to prevent bumping, and a minor amount of an agglomerating binder material to prevent stratification of the catalyst materials during preparation enclosed in a digestible container. In accordance with one preferred form of the invention, the non-reactive particulate material comprises ground pumice and the binder material comprises an oil such as mineral oil in an amount sufficient to agglomerate the solid components of the catalyst.

Figure 1:
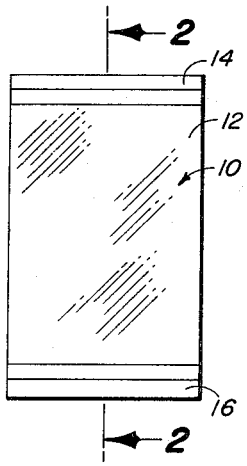
FIGURE 1 is a plan view of a packet embodying the present invention.
Figure 2:
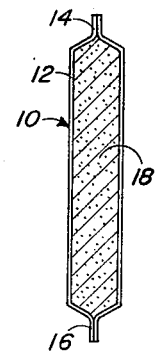
FIGURE 2 is a transverse vertical sectional view taken along line 2—2 of FIG. 1.

Referring now to the drawings, there is shown in FIGURES 1 and 2 a catalyst packet 10 in accordance with the present invention. The packet 10 is composed of a thin-walled container or tube 12 of a material such as an organic resin which is digestible in sulfuric acid. One example of such a resin is polyethylene. While various resins can be employed, they should, of course, contain no nitrogen. At the upper and lower ends of the packet 10, the tube 12 is sealed along parallel, transverse seal lines 14 and 16. The seals 14 and 16 are conveniently prepared with conventional heat-sealing equipment or other suitable means after the packet 10 has been filled.

It was found that the thickness of the wall of the tube 12 had an important bearing upon the time required for digestion which, of course, should be minimized. It was discovered that by employing a polyethylene film from about .0005 to about .0015 inch in thickness, the time required for the packet to open was substantially reduced by comparison with the results obtained in the prior art. For example, it was found that by employing a polyethylene film of from .001 inch thickness, the time required for the catalyst packet to open after placement in the Kjeldahl flask was from about 3 to 4 minutes less than that required in the case of a polyethylene film having a thickness of .002 inches. It was also surprising to find there was substantially less foaming during the digestion process presumably because of the reduced amount of polyethylene resin in the flask.

Within the packet 10 is carried the catalyst material indicated generally at 18. The catalyst 18 is present in the form of free-flowing, agglomerated masses or granules. It is composed of a major proportion of sodium sulfate, a relatively minor amount of copper selenite, a non-reactive particulate material to prevent bumping, and a minor amount of a binder material to prevent stratification of the catalyst materials during preparation. In accordance with one preferred form of the invention, the non-reactive particulate material comprises finely ground pumice. The liquid binder material comprises an oil such as mineral oil in an amount sufficient to agglomerate components of the catalyst.

Figure 3:
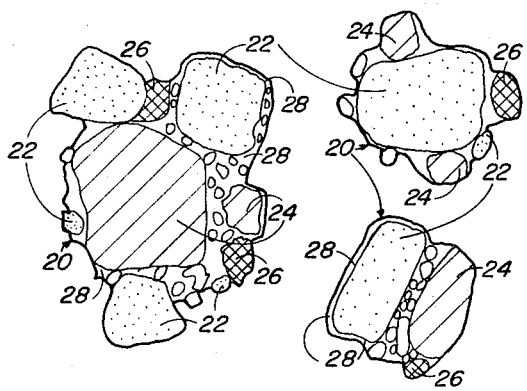
FIGURE 3 is a greatly enlarged view of the catalyst according to the invention as it appears when observed under the microscope.

Referring now to FIGURE 3 which illustrates the catalyst as it appears under a microscope, there are shown three agglomerated masses or granules each indicated generally at 20. The granules 20 each include sodium sulfate particles 22, copper selenite particles 24, a non-reactive particulate bumping inhibitor material such as pumice 26 and a nonvolatile liquid binder 28. As shown in the figure, the granules 20 are of various sizes. The binder material 28 coats most of the particles and completely encapsulates many of the finer particles which would form a dust in the absence of the binder. It can also be seen that the binder 20 holds the various component materials of the catalyst together so as to prevent stratification and the resultant likelihood that in the absence of the binder the different catalyst materials would be present in different amounts in different packets.

The amount of sodium sulfate to be used in each packet depends upon the particular test procedure being followed. In many of the standard Kjeldahl tests, such as test method 46–11 of the American Association of Cereal Chemists, 10 grams of the alkali metal sulfate is employed for every one gram of sample material which is to be tested (potassium sulfate in the case of the AACC test). In other standard tests, different amounts of the alkali metal sulfate can be employed. Greater amounts are usually required when a greater volume of protein material is to be tested.

Concerning the amount of copper selenite to use, enough should be present to provide a satisfactory digestion speed as indicated by the time required for the solution to become clear. If excessive amounts of copper selenite are employed, there may be a loss through the neck of the Kjeldahl flask. For most purposes, from about 1 to 3 parts by weight of copper selenite can be employed for each 100 parts by weight of sodium sulfate. In a preferred form of the invention, about 2 parts by weight of copper selenite are employed for each 100 parts by weight of sodium sulfate.

Among the advantages of the invention is the time saving made possible through the use of copper selenite. In a typical test, 12 minutes is saved for each analysis in an 18% protein composition. For a lower protein concentration, even greater time can be saved. In a composition containing less protein, even more time can be saved in most cases in comparison with a catalyst composition which includes no copper selenite. However, because of the high toxicity of copper selenite, in the past it has been difficult to handle and sometimes unsafe to use.

The preferred form of non-reactive particulate bumping inhibitor is finely divided pumice. While extra fine (FF grade) is preferred, other grades such as fine or coarse can be used. If relatively large particles are used, some stratification will take place which, of course, is undesirable. The amount of pumice to be employed will depend upon the amount required to effectively prevent violent or unsteady boiling. It was found that from about .5 to 2 parts of pumice by weight for each 100 parts by weight of sodium sulfate will be effective. In one preferred form of the invention, one part by weight of pumice is used for each 100 parts by weight of sodium sulfate.

As described hereinabove, the preferred binder material comprises a nonvolatile, nitrogen-free liquid with sufficient tack to hold the particles from which the catalyst is formed together in aggregated masses. While any of a variety of nitrogen-free oily materials can be employed, I prefer to employ a heavy-duty mineral oil having a viscosity of about 150 to 200 Saybolt seconds and preferably between 170 and 180 Saybolt seconds. Generally speaking, less viscous oils must be used in greater amounts to provide the same agglomerating effect. On the other hand, the binder should not be so viscous as to prevent the particulate materials of the catalyst from becoming coated. The minimum amount of binder which can be used is determined by the quantity required to prevent stratification of the dry ingredients by agglomerating the particles together. If too much of the binder material is present, the catalyst will not be free flowing and consequently difficult to measure and fill into the packets and also may remain in the form of lumps after the packet has been digested thereby increasing the time required for the catalyst to become effective in the reaction. It was found that from about .5 to 2 parts by weight of mineral oil binder should be used for each 100 parts by weight of sodium sulfate. About .75 parts by weight of binder for each 100 parts by weight of sodium sulfate was effective when heavy-duty mineral oil was used as a binder.

Figure 4:
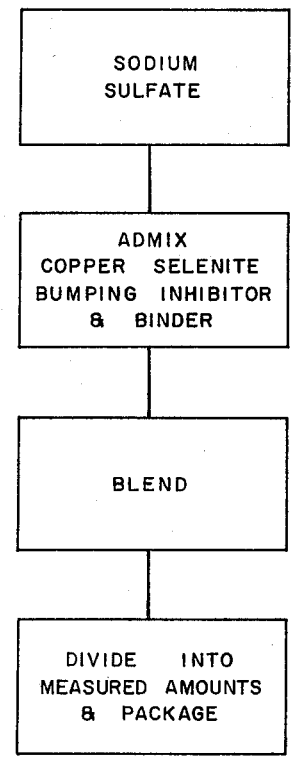
FIGURE 4 is a flow chart illustrating the steps performed in preparing and packaging the catalyst of the invention.

The process employed for forming the packet as set forth hereinabove will now be described by reference to FIGURE 4. To begin the operation, sodium sulfate is placed in a suitable mixing vessel. To this vessel is mixed copper selenite, the bumping inhibitor material and the binder. The materials are then thoroughly blended until a uniform, homogeneous and flowable mixture is produced. As blending is accomplished, the binder will coat most of the particulate material and bind the particles together to form the agglomerated masses 20. The blended material is then divided into measured quantities and packaged in the packets 10 by using any suitable and well-known packaging machine or by hand.

The invention will be better understood by reference to the examples set forth in Table I below, it being understood that after the packets have been formed, they are each used in performing the Kjeldahl nitrogen determination test substantially as set forth hereinbelow.

TABLE I

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Potassium sulfate | | | 100 | 100 | | | | | | 100 | 100 |
| Sodium sulfate | 100 | 100 | | | 100 | 100 | 100 | 100 | 100 | | |
| Copper selenite | 1 | 1 | 1 | 3 | 3 | 3 | 2 | 2 | 2 | 2 | 1 |
| Light mineral oil, U.S.P. | 1 | | | 1 | | | | | | 1 | 2 |
| Heavy mineral oil, 175 Say. Seconds | | .79 | .79 | | .2 | .2 | .79 | .75 | .75 | | |
| Polyethylene packet, thickness, .0005 in. | x | x | x | | | | | x | | | |
| Polyethylene packet, thickness, .0015 in. | | | | x | | | | | x | x | |
| Polyethylene packet, thickness, .001 in. | | | | | x | x | x | | | | x |
| Pumice (fine, FF grade) | .5 | .5 | 1 | | .5 | 1 | | | .5 | .5 | |
| Pumice (coarse) | | | | .5 | | | 1 | 2 | | | 1 |

All amounts given are parts by weight.

The following Kjeldahl nitrogen determination test is set forth by way of example. To begin the test, one gram of flour or other protein-containing substance is transferred to a Kjeldahl flask. The catalyst packet according to the invention is then inserted into the flask and 25 ml. concentrated sulfuric acid is added. Digestion is then carried out by boiling for a period of 45 minutes on a 500 watt digestion heater. After digestion, the flask is removed and cooled, but the contents are not allowed to crystallize. About 300 ml. of water and 70 ml. of concentrated sodium hydroxide are then added. The flask is placed on a distillation rack until 150 to 200 ml. of distillate is collected. The distillate is collected in a beaker containing 60 ml. of 4% boric acid solution containing an indicator such as Methyl Purple. The distillate is then titrated past grey color to the first light purple color with .1253 N sulfuric acid. The number of milliliters of acid used is reported directly as the percentage of protein present in the flour sample. For other materials, a special factor for protein conversion must be used.

While the invention is described in connection with a preferred embodiment thereof, it will be understood that it is not intended to limit the invention thereto but rather it is intended to cover all alternative constructions and modifications falling within the spirit and scope of the appended claims.

I claim:
1. An agglomerated granular free-flowing protein digestion catalyst for conducting Kjeldahl protein determination tests, said catalyst comprising:
    (a) a major proportion of sodium sulphate present in particulated form,
    (b) a finely divided bumping inhibitor in an amount sufficient to prevent uncontrolled boiling during the performance of said Kjeldahl determination,
    (c) an effective amount of copper selenite present in particulated form,
    (d) a binder comprising a nitrogen-free non-volatile and normally tacky liquid in an amount sufficient to cause the particles to adhere to one another and form free-flowing agglomerates, and
    (e) a container enclosing said catalyst comprising a thin film of a nitrogen-free resinous sheet material soluble in sulphuric acid.
2. An agglomerated granular free-flowing protein digestion catalyst for conducting Kjeldahl protein determination tests, comprising:
    (a) a package comprising a thin film of polyethylene sheet material enclosing said catalyst and said catalyst comprising:
    (b) a major proportion of sodium sulphate present in particulated form,
    (c) a finely divided bumping inhibitor in an amount sufficient to prevent uncontrolled boiling during the performance of said Kjeldahl determination,
    (d) an effective amount of copper selenite present in particulated form, and
    (e) a binder comprising a nitrogen-free non-volatile and normally tacky liquid in an amount sufficient to cause the particles to adhere to one another and form free-flowing agglomerates.
3. An agglomerated granular free-flowing protein digestion catalyst for conducting Kjeldahl protein determination tests, said catalyst comprising:
    (a) a major proportion of sodium sulphate present in particulated form,
    (b) from about 1 to 3 parts by weight of copper selenite for each 100 parts by weight of sodium sulphate,
    (c) a binder comprising a nitrogen-free non-volatile and normally tacky liquid in an amount sufficient to cause the particles to adhere to one another and form free-flowing agglomerates, and
    (d) a package enclosing said catalyst comprising a thin film of a nitrogen-free resinous sheet material soluble in sulphuric acid.
4. An agglomerated granular free-flowing protein digestion catalyst for conducting Kjeldahl protein determination tests, said catalyst comprising:
    (a) a major proportion of sodium sulphate present in particulated form,
    (b) from about 1 to 3 parts by weight of copper selenite for each 100 parts by weight of sodium sulphate,
    (c) a relatively small amount of pumice present in particulated form,
    (d) a binder comprising a nitrogen-free non-volatile and normally tacky liquid in an amount sufficient to cause the particles to adhere to one another and form free-flowing agglomerates, said binder comprising essentially of a heavy duty mineral oil present in the amount of from about .2 to 2 parts by weight for each 100 parts by weight of sodium sulphate, and
    (e) a package enclosing said catalyst comprising a thin film of a nitrogen-free resinous sheet material soluble in sulphuric acid.
5. A packaged free-flowing granular agglomerated protein digestion catalyst for conducting Kjeldahl nitrogen protein determinations consisting essentially of:
    (a) a major proportion of particulated sodium sulphate,
    (b) about 1 to 3 parts by weight of copper selenite for each 100 parts by weight of sodium sulphate,
    (c) from about .5 to 2 parts by weight of granulated pumice for each 100 parts by weight of sodium sulphate,
    (d) a non-volatile, nitrogen-free binder formed from a tacky nitrogen-free liquid present in the amount of from about .2 to 2 parts by weight for each 100 parts by weight of sodium sulphate, and
    (e) a package enclosing the catalyst, said package comprising a thin film of nitrogen-free resinous sheet material soluble in sulphuric acid.
6. An agglomerated granular free-flowing protein digestion catalyst for conducting Kjeldahl protein determination tests, said catalyst comprising:
    (a) a major proportion of alkali metal sulphate present in particulated form,
    (b) a finely divided bumping inhibitor in an amount sufficient to prevent uncontrolled boiling during the performance of said Kjeldahl determination,
    (c) an effective amount of copper selenite present in particulated form,
    (d) a binder comprising a nitrogen-free non-volatile and tacky material in an amount sufficient to cause the particles to adhere to one another and form free-flowing agglomerates, and
    (e) a container enclosing said catalyst comprising a thin film of a nitrogen-free resinous sheet material soluble in sulphuric acid.
7. The agglomerated granular free-flowing protein digestion catalyst of claim 6 wherein said alkali metal sulphate comprises potassium sulphate.

References Cited

UNITED STATES PATENTS 2,820,699   1/1958   Morris _____ 23—230

OTHER REFERENCES

Copper Selenite as a Catalyst in the Kjeldahl Nitrogen Determination, Journal of Biological Chemistry, vol. 113, pages 749 to 751 (1931).

DANIEL E. WYMAN, *Primary Examiner.*

L. G. XIARHOS, *Assistant Examiner.*